US008616621B2

(12) United States Patent
LaConte

(10) Patent No.: US 8,616,621 B2
(45) Date of Patent: Dec. 31, 2013

(54) POTTED PANEL LATCH SYSTEM

(75) Inventor: Richard J. LaConte, Black Diamond, WA (US)

(73) Assignee: Harper Engineering Co., Renton, WA (US)

( * ) Notice: Subject to any disclaimer, the term of this patent is extended or adjusted under 35 U.S.C. 154(b) by 375 days.

(21) Appl. No.: 12/849,572

(22) Filed: Aug. 3, 2010

(65) Prior Publication Data

US 2012/0031010 A1    Feb. 9, 2012

(51) Int. Cl.
*B60R 13/04*    (2006.01)

(52) U.S. Cl.
USPC ........................................................... 296/191

(58) Field of Classification Search
USPC ........... 296/191; 52/588.1, 592.1, 578, 589.1, 52/590.2; 292/336.3, DIG. 31, DIG. 53
See application file for complete search history.

(56) References Cited

U.S. PATENT DOCUMENTS

| | | | | |
|---|---|---|---|---|
| 3,598,273 | A * | 8/1971 | Rau et al. | 220/1.5 |
| 3,964,636 | A * | 6/1976 | Rehrig | 220/495.06 |
| 4,344,995 | A * | 8/1982 | Hammer | 428/61 |
| 4,799,631 | A * | 1/1989 | Humphries et al. | 244/118.5 |
| 4,867,395 | A * | 9/1989 | Taylor et al. | 244/158.1 |
| 4,936,377 | A * | 6/1990 | DeVogel et al. | 165/47 |
| 5,005,531 | A * | 4/1991 | Nelson | 122/19.2 |
| 5,028,474 | A * | 7/1991 | Czaplicki | 428/178 |
| 5,086,587 | A * | 2/1992 | Andrews | 49/395 |
| 5,108,048 | A * | 4/1992 | Chang | 244/118.1 |
| 5,150,863 | A * | 9/1992 | Hozumi | 244/118.5 |
| 5,795,043 | A * | 8/1998 | Johnson et al. | 312/229 |
| 6,056,349 | A * | 5/2000 | Seksaria et al. | 296/146.6 |
| 6,574,841 | B1 * | 6/2003 | Vosahlik et al. | 27/16 |
| 6,623,209 | B1 * | 9/2003 | Waters, Jr. | 405/94 |
| 6,718,776 | B2 * | 4/2004 | Wessling et al. | 62/60 |
| 6,742,974 | B2 * | 6/2004 | Haire | 410/115 |
| 7,380,858 | B2 * | 6/2008 | Araga et al. | 296/39.3 |
| 7,484,792 | B2 * | 2/2009 | Penner | 296/187.05 |
| 7,537,264 | B2 * | 5/2009 | Maimin et al. | 296/100.09 |
| 7,637,686 | B2 * | 12/2009 | Wood et al. | 403/302 |
| 7,789,452 | B2 * | 9/2010 | Dempsey et al. | 296/173 |
| 7,874,587 | B2 * | 1/2011 | Miki et al. | 280/752 |
| 7,931,237 | B2 * | 4/2011 | Penzo | 244/173.1 |
| 7,942,430 | B2 * | 5/2011 | Van Loon et al. | 280/47.34 |
| 8,061,758 | B2 * | 11/2011 | Maimin et al. | 296/100.09 |
| 8,182,021 | B2 * | 5/2012 | Maimin et al. | 296/100.09 |
| 8,215,585 | B2 * | 7/2012 | Gerken et al. | 244/133 |
| 8,286,917 | B2 * | 10/2012 | Erickson et al. | 244/131 |
| 8,286,919 | B2 * | 10/2012 | Gerken et al. | 244/133 |
| 2003/0024191 | A1 * | 2/2003 | Hampel | 52/309.1 |
| 2005/0028333 | A1 * | 2/2005 | Vosahlik et al. | 27/14 |
| 2005/0252114 | A1 * | 11/2005 | Marschall | 52/204.593 |
| 2007/0267889 | A1 * | 11/2007 | Flendrig et al. | 296/146.6 |
| 2008/0110056 | A1 * | 5/2008 | Mann et al. | 36/105 |
| 2012/0205939 | A1 * | 8/2012 | Maimin et al. | 296/100.07 |

OTHER PUBLICATIONS

Shur-Lok Products, Sandwich Structure, URL: http://www.shur-lok.com/contents/products/sandwich.html, 2012, download date Aug. 12, 2013.

* cited by examiner

*Primary Examiner* — Kiran B Patel
(74) *Attorney, Agent, or Firm* — Seed IP Law Group PLLC

(57) ABSTRACT

A method of preparing and a finished panel and latch combination, wherein the panel and latch mounting combination are seamless and attractive.

3 Claims, 5 Drawing Sheets

POTTED PANEL LATCH SYSTEM

TECHNICAL FIELD

This invention relates to a recessed latch system, and more particularly to a latch system which is fabricated in a fashion that creates a seamless appearance and complements or blends in with the supporting panel, greatly improving the appearance and sanitation.

BACKGROUND OF THE INVENTION

Latch members for securement for storage in passenger vehicles, including airplanes, have typically been recessed to avoid inadvertent snags or injuries. Typically, these latch members are pre-fabricated and simply secured into a pre-prepared opening in the panel. Although this is economical and functional, it yields a product which is utilitarian, unattractive and creates an environment difficult to clean.

Hardware for use in airplanes in particular needs to be reliable, lightweight and attractive. Because of the economics and environment, these devices must be quickly and easily sanitized.

SUMMARY OF THE INVENTION

With the above-noted background in mind, it is highly desirable to produce a recessed latch system wherein the latch appears to be an integral part of the supporting panel.

It is further desirable to provide a recessed latch system wherein the exposed body of the latch and the surface of the panel present a unitary appearance.

It is still further desirable that a recessed latch and panel be fabricated in a manner which is simple and economical, yielding an attractive, seamless product.

BEST MODE FOR CARRYING OUT THE INVENTION

Figure 1:
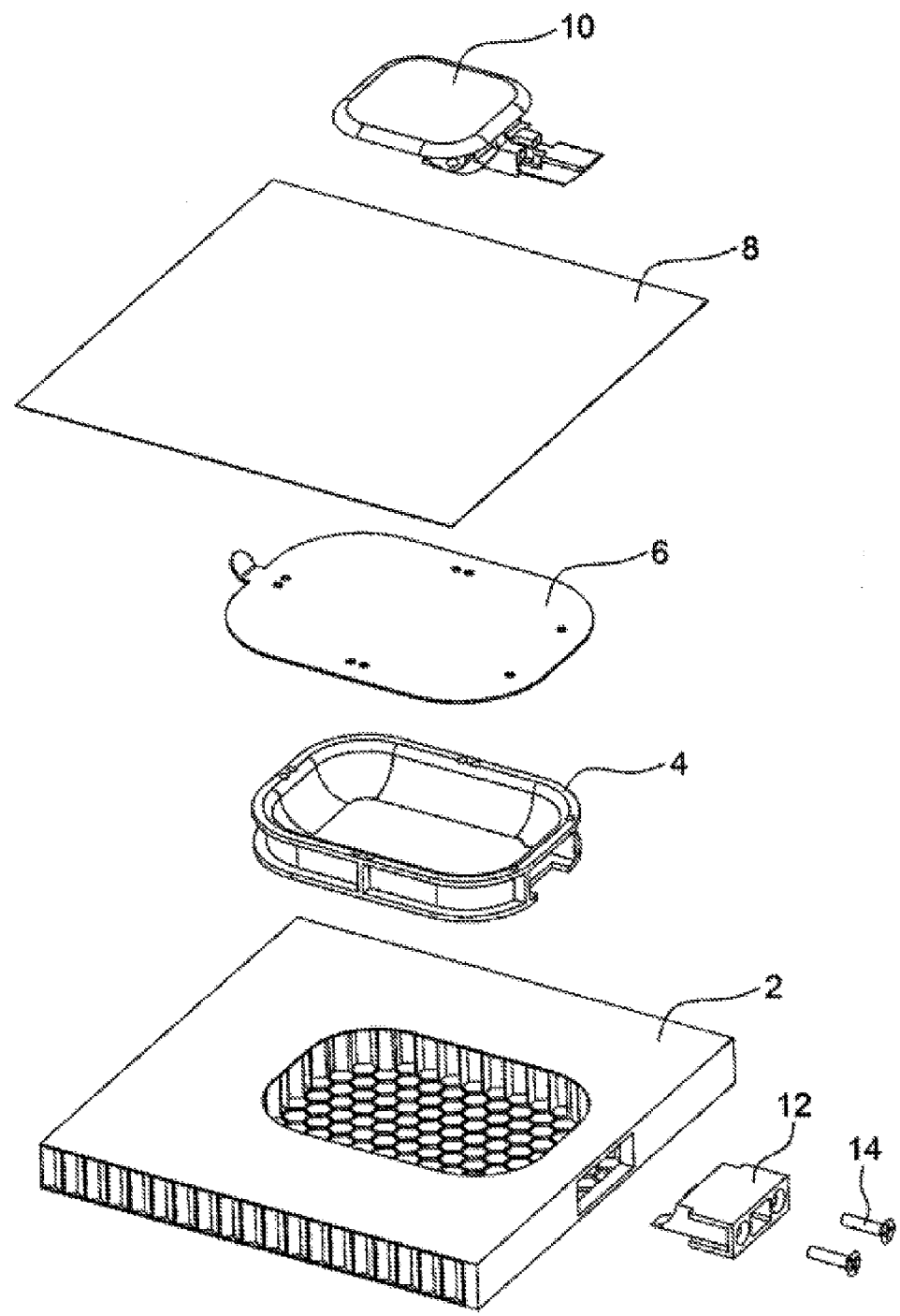
FIG. 1 is an exploded view of the recessed latch, its component parts as well as the supporting panel.

As seen in FIG. 1, which is exploded to expose all parts of the inventive installation, there is a honeycomb panel 2, a latch body or base 4, a blank or potting cover 6, a decorative coating or sheet 8 and a latch mechanism 10. Also seen in this view is a latch guide 12 and securement screws 14.

Figure 2:
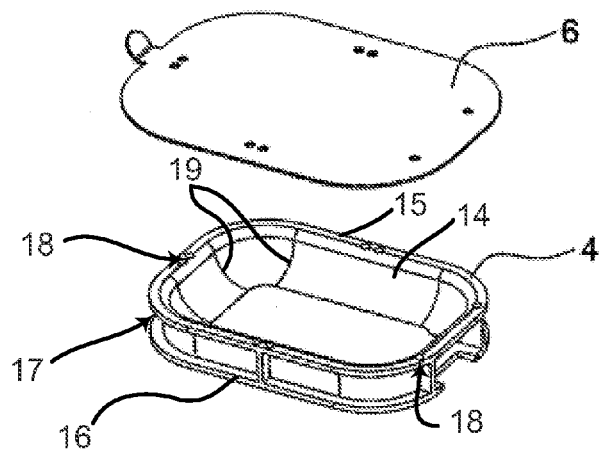
FIG. 2 displays the pre-assembly of the potting cove to the latch body.
Figure 3:
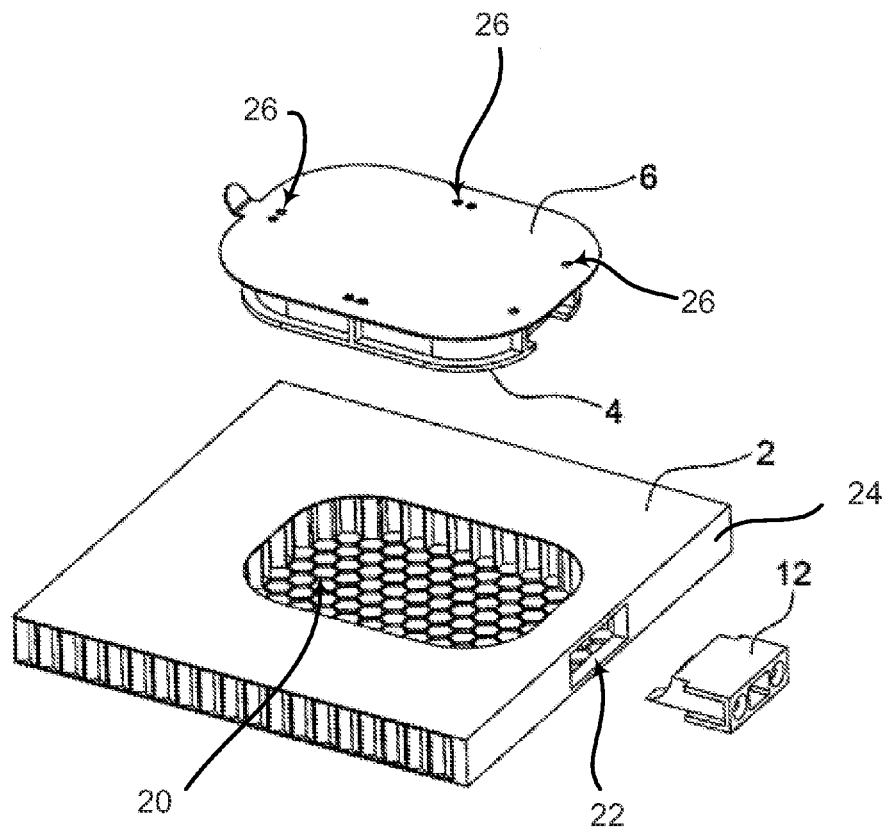
FIGS. 3, 4 and 5 illustrate steps in the process.
Figure 4:
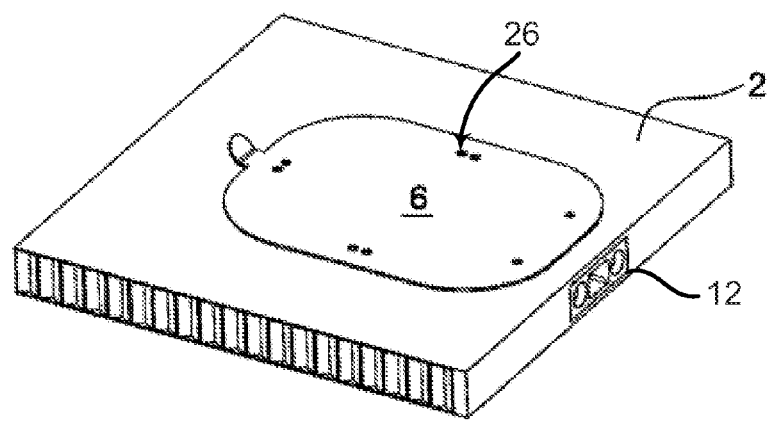
Figure 5:
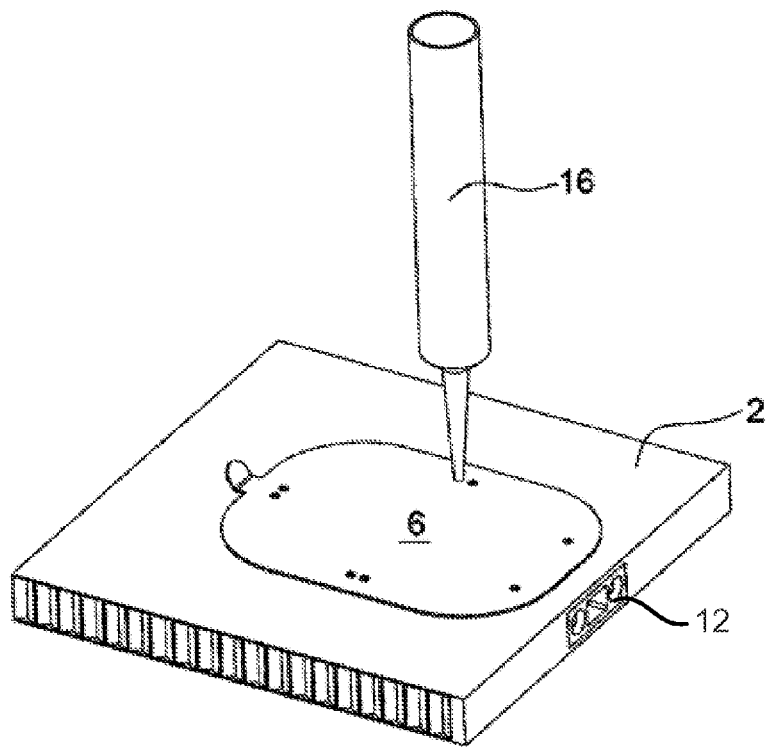

Reference is now had to FIGS. 2, 3, 4 and 5, wherein a base 4 and latch guide 12 are potted into a honeycomb panel 2. FIG. 2 depicts a potting cover 6 attached to the base 4. As illustrated in FIG. 2, the base 4 includes interior side walls 14 that form a boundary around the base 4, with an upper flange 15 extending outwardly from an upper end of the base 4 and a lower flange 16 extending outwardly from a lower end of the base 4, creating a cavity 17 therebetween. The interior side walls 14 include a plurality of seams 19 that are generally positioned around corner portions of the base 4. The upper flange 15 includes a plurality of apertures 18, which allow adhesive to be applied therethrough, as illustrated in FIG. 5, and fill the cavity 17 so as to allow the adhesive to bond the base 4 to the honeycomb panel 2. FIG. 3 shows the base 4 with the potting cover 6 positioned to be placed into a prepared cavity or recess 20 of the honeycomb panel 2. The potting cover 6 includes a plurality of apertures 26 that are positioned at a perimeter of the potting cover 6 and substantially align with the plurality of apertures 18 of the base 4 so as to allow the adhesive to be applied therethrough. Further, as illustrated in FIG. 3, the latch guide 12 is positioned to be coupled to the honeycomb panel 2 by securing the latch guide 12 within a latch guide opening 22. The latch guide opening 22 extends through a side surface 24 of the honeycomb panel 2 and intersects the recess 20. FIG. 4 illustrates the base 4 with the potting cover 6 secured to the prepared cavity or recess 20 and the latch guide 12 secured into the latch guide opening 22 of the panel 2; then it is potted in place using an adhesive applicator tube 16, as shown in FIG. 5.

Figure 6:
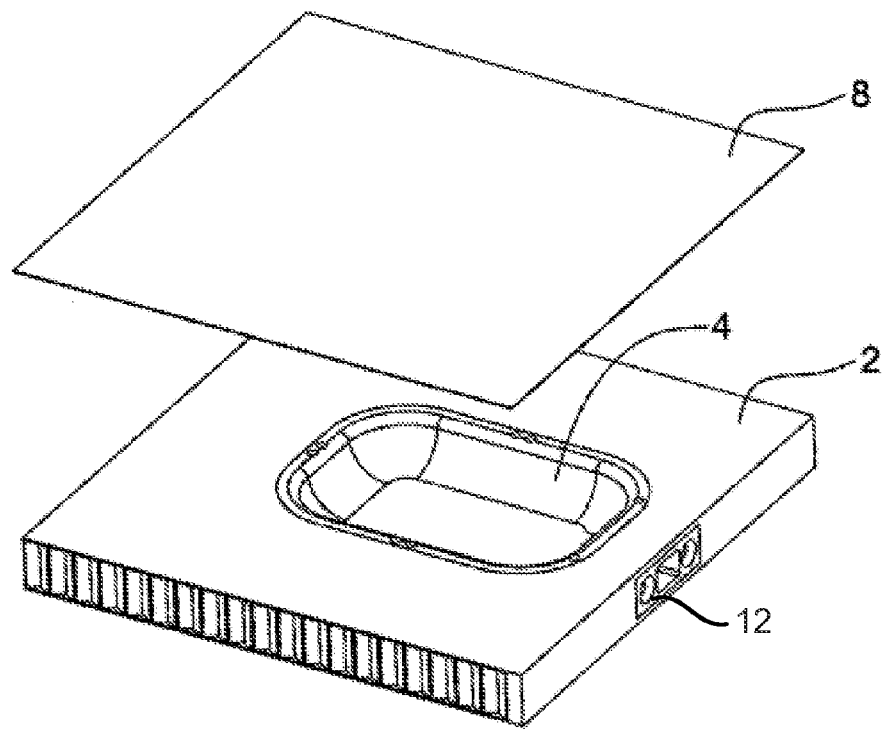
FIG. 6 is an exploded view displaying the decorative sheet about to be secured in places.
Figure 7:
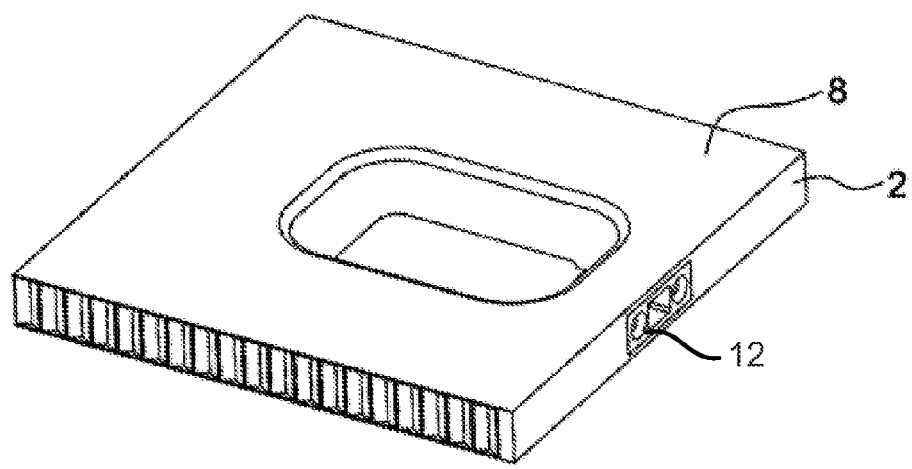
FIG. 7 shows the decorative sheet having been vacuumed and secured in position.

Reference is now had to FIG. 6, wherein the base 4 is in place and the decorative coating 8 is about to be placed over the secured base 4 for the panel 2 and vacuumed into the cavity 20, covering the base 4 and the panel 2, forming a seamless transition from the surface of the panel throughout the base 4, as best seen in FIG. 7. This results in an attractive, easily cleaned panel and latch member.

Figure 8:
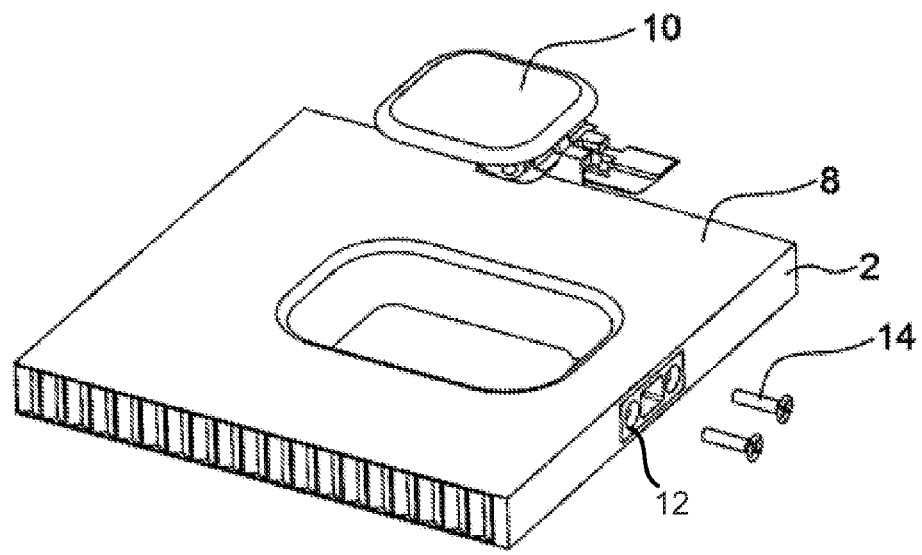
FIG. 8 shows the mechanism about to be inserted into the prepared body and panel.
Figure 9:
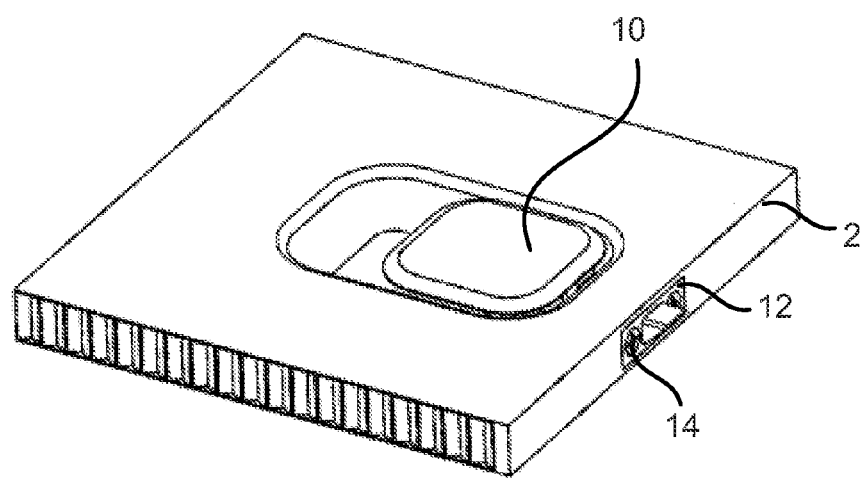
FIG. 9 displays the completed decorative seamless product.

As seen in FIG. 8, the latch mechanism 10 then is in place in position and secured with the screws 14, inserted through the latch guide 12, resulting in a finished panel and latch combination as seen in FIG. 9, wherein the smooth transition and the panel throughout the latch base is seamless and attractive.

Although a preferred embodiment has been disclosed for purposes of illustration, it should be understood that various changes and modifications and substitutions could be made in the preferred embodiment without departing from the spirit of the invention, as defined by the claims which follow:

The invention claimed is:

1. A decorative panel comprising:
   a honeycomb panel, including a recess in a face thereof, and a latch guide opening extending from a side surface of the honeycomb panel to intersect the recess;
   a latch body secured in said recess;
   a decorative sheet covering the face of the honeycomb panel and the latch body, the decorative sheet providing an appearance of a continuous panel; and
   a latch mechanism secured in the latch body overlying the decorative sheet.

2. A panel for use in connection with airplane storage, the panel comprising:
   a honeycomb panel having a recess in an exterior surface thereof and a latch guide opening extending from a side surface of the honeycomb panel to intersect the recess;
   a latch body coupled to the honeycomb panel, the latch body being secured to the honeycomb panel within the recess, wherein the latch body includes a plurality of apertures, the plurality of apertures being positioned to allow an adhesive to pass therethrough so as to bond the latch body to the honeycomb panel;
   a latch guide coupled to the honeycomb panel, the latch guide being secured within the latch guide opening; and
   a decorative sheet coupled to the honeycomb panel, the decorative sheet covering the plurality of apertures to provide an appearance of a continuous panel.

3. The panel of claim 2 wherein an interior side of the latch body includes a plurality of seams, the decorative sheet covering the plurality of seams to provide an appearance of a substantially seamless panel.

\* \* \* \* \*